US010437527B2

(12) United States Patent
Bermundo et al.

(10) Patent No.: US 10,437,527 B2
(45) Date of Patent: Oct. 8, 2019

(54) SYSTEM AND METHOD FOR PRE-GENERATION OF PAGE DESCRIPTION LANGUAGE (PDL) FOR PRINTING

(71) Applicant: KYOCERA Document Solutions Inc., Chuo-Ku, Osaka (JP)

(72) Inventors: Neil-Paul Payoyo Bermundo, Concord, CA (US); Philip Ver Paloma Dabon, Concord, CA (US); Kendrick Esperanza Wong, Concord, CA (US); Jesus Reyes Beltran, Concord, CA (US)

(73) Assignee: Kyocera Document Solutions Inc., Chuo-Ku, Osaka (JP)

( * ) Notice: Subject to any disclaimer, the term of this patent is extended or adjusted under 35 U.S.C. 154(b) by 0 days.

(21) Appl. No.: 15/477,098

(22) Filed: Apr. 2, 2017

(65) Prior Publication Data
US 2018/0285036 A1    Oct. 4, 2018

(51) Int. Cl.
*G06F 3/12* (2006.01)
*G06K 15/02* (2006.01)

(52) U.S. Cl.
CPC ............ *G06F 3/1214* (2013.01); *G06F 3/126* (2013.01); *G06F 3/128* (2013.01); *G06F 3/1245* (2013.01); *G06F 3/1248* (2013.01); *G06F 3/1273* (2013.01); *G06F 3/1285* (2013.01)

(58) Field of Classification Search
None
See application file for complete search history.

(56) References Cited

U.S. PATENT DOCUMENTS

| 6,304,336 B1* | 10/2001 | Sugaya | G06K 15/02 358/1.11 |
| 6,633,395 B1* | 10/2003 | Tuchitoi | G06F 3/1212 358/1.14 |
| 2009/0051969 A1* | 2/2009 | Yoo | H04N 1/00204 358/1.16 |
| 2009/0168100 A1* | 7/2009 | Huster | G06F 3/1212 358/1.15 |

(Continued)

FOREIGN PATENT DOCUMENTS

| JP | 2005-144780 | * | 6/2005 | ............ B41J 29/38 |
| JP | 2012-083973 | * | 4/2012 | ............ G06F 3/12 |

*Primary Examiner* — Beniyam Menberu
(74) *Attorney, Agent, or Firm* — Rimon PC

(57) ABSTRACT

The present application is directed to system and method for pre-generation of page description language (PDL) for printing. Aspects of the present disclosure relate to methods, systems, and computer readable mediums for pre-generating a page description language (PDL) print job for documents for printing. Such pre-generation of the PDL achieves almost instantaneous and efficient printing experience. The methods, systems, and computer readable mediums by pre-generation of the PDL achieves faster printing turnaround time from the time when user clicks "OK" to print the document to the time user picks up the print out is required. The method for pre-generating a PDL print job for a document for printing can determine an instance to pre-generate the PDL print job for the document before the manual election for printing, and issuing a printing instruction in response to a manual election, to send of the pre-generated PDL print job to a printing device.

17 Claims, 4 Drawing Sheets

(56) References Cited

U.S. PATENT DOCUMENTS

| | | | | |
|---|---|---|---|---|
| 2012/0105900 A1* | 5/2012 | Tsuzuki | ............... | G06F 21/608 358/1.14 |
| 2013/0258408 A1* | 10/2013 | Mizutani | ............ | G03G 15/5091 358/1.16 |
| 2014/0063547 A1* | 3/2014 | Sakurai | ................ | G06F 3/1211 358/1.15 |
| 2016/0133046 A1* | 5/2016 | Tokumoto | ............. | G06T 15/503 345/592 |
| 2016/0299730 A1* | 10/2016 | Tsunekawa | ........... | G06F 3/1247 |
| 2017/0039013 A1* | 2/2017 | Tsunekawa | ........ | H04N 1/00307 |

* cited by examiner

SYSTEM AND METHOD FOR PRE-GENERATION OF PAGE DESCRIPTION LANGUAGE (PDL) FOR PRINTING

TECHNICAL FIELD

Methods and example implementations described herein are generally directed to a data processing device for generating a print job for performing stock printing, and more specifically, to a smart print job pre-generator (SPJPG) mechanism to pre-generate a page description language (PDL) print job for documents and/or files for printing.

BACKGROUND

Printing is a process for reproducing text and images using a master form or template. In computing, a printer is a peripheral that makes a persistent human-readable representation of graphics or text on paper or similar physical media. Conventionally, the printer has to be mandatorily connected to machines for printing purposes. However, along with the advancement of Internet and LAN, it has become easy to construct a network having a large number of terminal devices (personal computers), printers, servers and other devices. There are many systems available in the market today that enables remote printing to be performed in such a network.

Remote printing is a printing method that sends a printing instruction from an arbitrary device (terminal device, printer etc.) in the network to a storage server (storage) in the network that stores the print job (print command), thereby enabling printing to be performed using a desired printer. However, while printing any document, content of the document has to be in prescribed format/computer language. For example, in digital printing, a page description language (PDL) is a computer language that describes appearance of a printed page in a higher level than an actual output bitmap. With advancement in technology, there are various advancements in printing mechanisms as well.

Generally, existing printing mechanisms occur in a three-fold manner as shown in FIG. 1. FIG. 1 illustrates existing printing experience of processing life cycle of a print job. As shown in FIG. 1, at step 102, a user starts printing a document on account of which, at step 104, a printer driver generates a page description language (PDL) print job, which is then transmitted to printer engine at step 106. Upon receipt of PDL print job, at step 108, printer engine processes PDL print job for print output. However, existing printing mechanisms may have following limitations in addition to other un-cited limitations. First limitation of existing printing mechanisms is that the lifecycle of print job utilizes a significant amount of time, and (usually) causes user to wait for the desired document to be printed.

Therefore, there is a need for print jobs to be generated quicker and executed faster in order to reduce printing, processing, and waiting time, i.e., an improvement to lessen the time from the first step (102 of FIG. 1) to finish (108 of FIG. 1) is required, or in other words, an improvement to lessen the time from the time when user clicks "OK" to print the document to the time user picks up the print out is required.

SUMMARY

The present invention has been conceived in order to solve the above-described problems, and the present invention has the object of providing a smart print job pre-generator (SPJPG) mechanism to pre-generate a page description language (PDL) print job for documents and/or files for printing.

Aspects of the present disclosure relate to methods, systems, and computer readable mediums for pre-generating a page description language (PDL) print job for a documents or file (collectively and interchangeably referred to as document(s) hereinafter) for printing. Such pre-generation of PDL achieves almost instantaneous and efficient printing experience. The methods, systems, and computer readable mediums, by pre-generation of the PDL, help achieve faster printing turnaround from the time a user starts print to the time when printed-paper is ejected from printer.

An aspect of the present disclosure relates to a method for pre-generating a page description language (PDL) print job for a document for printing, wherein the method can include the steps of determining an instance to pre-generate the PDL print job for the document, caching the pre-generated PDL print job, and issuing a printing instruction in response to a manual election, wherein transmission of the printing instruction enables sending of the pre-generated PDL print job to a printing device and the instance to pre-generate the PDL print job for the document is determined before the manual election.

In an example implementation, the instance can be determined from any or a combination of when a user creates or opens the document, when the user edits the document but does not make any change for a certain period of time, or when the user opens print dialog, or when the user opens printing preferences, or any combination thereof.

In an aspect, the document can be an offline document that is transmitted directly to printers and/or is transmitted via a print queue or a print spooler. In an example implementation, the document can be a portable document that is carried around in a USB drive or copied from one computer to another or copied from cloud storage to another location.

In an aspect, the pre-generated PDL print job can be transmitted and then cached at a print queue. In an example, cached pre-generated PDL print job can be provided with identifying information, based on which the PDL print job can be arranged in the print queue. Further, in an aspect, a latest version of the pre-generated PDL print job may be retained in the cache.

In an aspect, the present disclosure relates to a system for pre-generating a page description language (PDL) print job for a document to be printed, wherein the system can include a print job pre-generator module, a cache module, and a printing module. In an aspect, the print job pre-generator module can be configured to determine an instance to pre-generate the PDL print job for the document, the cache module can be configured to cache the pre-generated PDL print job, and the printing module can be configured to issue, in response to a manual election, a printing instruction for printing the PDL print job.

In an aspect, the present disclosure relates to a non-transitory computer readable storage medium storing instructions executable by a processor at a print device, the computer-program instructions when executed by the processor for performing operations can determine an instance to pre-generate a PDL print job for a document, cache the pre-generated PDL print job, and issue a printing instruction in response to a manual election, wherein transmission of the printing instruction enables sending of the pre-generated PDL print job to a printing device and the instance to pre-generate the PDL print job for the document is determined before the manual election.

DETAILED DESCRIPTION

Figure 1:
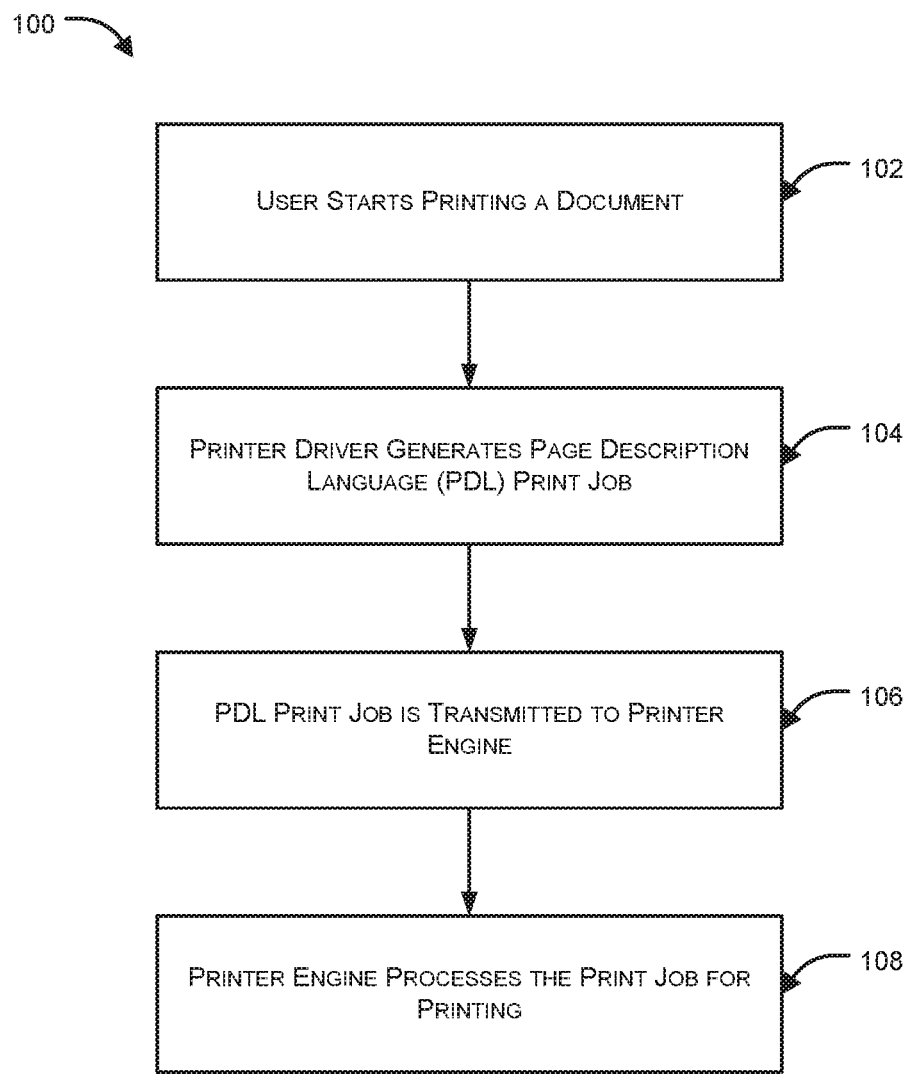
FIG. 1 illustrates existing printing experience of processing life cycle of a print job.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Aspects of the present disclosure relate to methods, systems, and computer readable mediums for pre-generating a page description language (PDL) print job for a documents or file (collectively and interchangeably referred to as document(s) hereinafter) for printing. Such pre-generation of PDL achieves almost instantaneous and efficient printing experience. The methods, systems, and computer readable mediums, by pre-generation of the PDL, help achieve faster printing turnaround from the time a user starts print to the time when printed-paper is ejected from printer.

An aspect of the present disclosure relates to a method for pre-generating a page description language (PDL) print job for a document for printing, wherein the method can include the steps of determining an instance to pre-generate the PDL print job for the document, caching the pre-generated PDL print job, and issuing a printing instruction in response to a manual election, wherein transmission of the printing instruction enables sending of the pre-generated PDL print job to a printing device and the instance to pre-generate the PDL print job for the document is determined before the manual election.

In an example implementation, the instance can be determined from any or a combination of when a user creates or opens the document, when the user edits the document but does not make any change for a certain period of time, or when the user opens print dialog, or when the user opens printing preferences, or any combination thereof.

In an aspect, the document can be an offline document that is transmitted directly to printers and/or is transmitted via a print queue or a print spooler. In an example implementation, the document can be a portable document that is carried around in a USB drive or copied from one computer to another or copied from cloud storage to another location.

In an aspect, the pre-generated PDL print job can be transmitted and then cached at a print queue. In an example, cached pre-generated PDL print job can be provided with identifying information, based on which the PDL print job can be arranged in the print queue. Further, in an aspect, a latest version of the pre-generated PDL print job may be retained in the cache.

In an aspect, the present disclosure relates to a system for pre-generating a page description language (PDL) print job for a document to be printed, wherein the system can include a print job pre-generator module, a cache module, and a printing module. In an aspect, the print job pre-generator module can be configured to determine an instance to pre-generate the PDL print job for the document, the cache module can be configured to cache the pre-generated PDL print job, and the printing module can be configured to issue, in response to a manual election, a printing instruction for printing the PDL print job.

In an aspect, the present disclosure relates to a non-transitory computer readable storage medium storing instructions executable by a processor at a print device, the computer-program instructions when executed by the processor for performing operations can determine an instance to pre-generate a PDL print job for a document, cache the pre-generated PDL print job, and issue a printing instruction in response to a manual election, wherein transmission of the printing instruction enables sending of the pre-generated PDL print job to a printing device and the instance to pre-generate the PDL print job for the document is determined before the manual election.

In an aspect of the present disclosure relates to a smart print job pre-generator (SPJPG) feature to pre-generate PDL print job for currently loaded documents or offline files that can be considered for printing. The SPJPG can achieve almost instantaneous and efficient printing experience. The SPJPG enables to achieve faster printing turnaround time from the time when user clicks "OK" to print the document to the time user picks up the print out is required.

Figure 2:
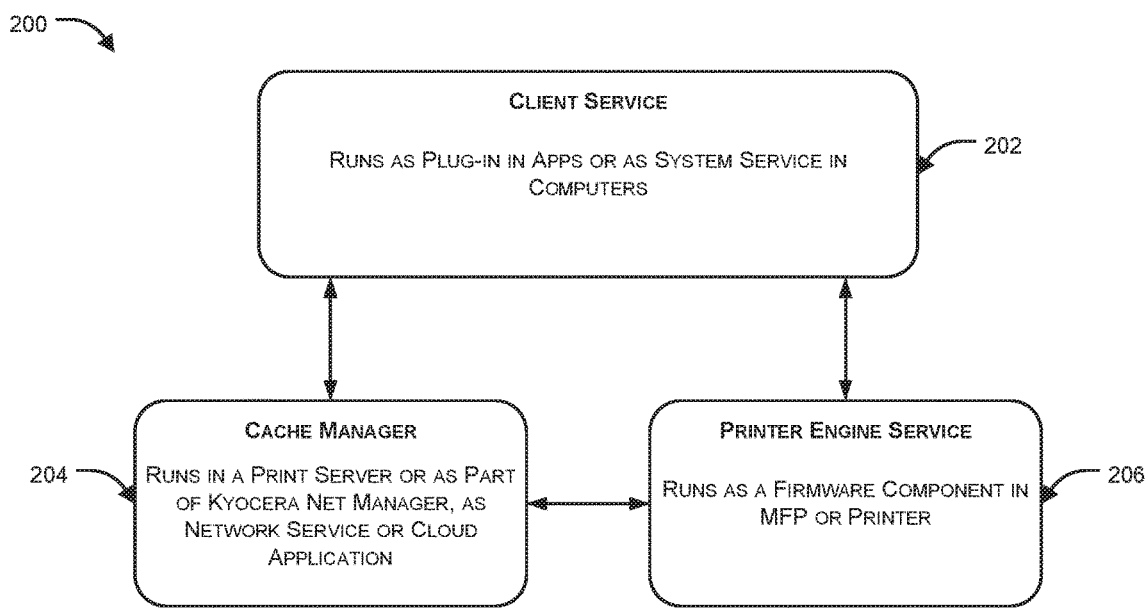
FIG. 2 illustrates an exemplary system diagram illustrating interaction between three components of the proposed system in accordance with an embodiment of the present disclosure.

FIG. 2 illustrates an exemplary system diagram illustrating interaction between three components of the proposed system in accordance with an embodiment of the present disclosure. As can be seen from the example representation of FIG. 2, the proposed system can include a client service platform 202, a cache manager 204, and a printer engine service 206. In an example implementation, the client service platform 202 can pre-generate a page description language (PDL) print job along with information therein, and can communicate the pre-generated PDL print job to the cache manager 204 to perform functions such as but not limited to analyzing, caching, processing, etc. and can thereby execute the PDL print job by the printer engine service 206 to perform immediate printing.

In an embodiment, the client service platform 202 can be an application that runs as a background process or as a system service on a desktop, portable computer, tablet or mobile device. The client service platform 202 can also be configured as plug-in software for document-editing applications, Internet browser applications, or any application that allows for and provides printing capabilities.

In an exemplary implementation, client service platform 202 can be interfaced and operated with one or more existing document-editing applications for pre-generation of documents that are loaded in the application, and/or pre-generation of offline documents. The existing document-editing applications can include but are not limited to MS word or Open Office, printer driver, and the like.

In another exemplary implementation, client service platform 202 can also be interfaced and operated with printer driver for pre-generation of documents that are loaded in the application and/or for pre-generation of offline documents.

In an implementation, client service platform 202 can cache pre-generated print job either at host computer or at network shared storage or at a cloud storage service. It may also send the pre-generated print job to a default printer in anticipation of the user printing the document. In an example implementation, when the pre-generated print job is sent in advance to a printer, it can eventually send a secondary signal to the printer to initiate actual printing using the pre-generated print job. In an example, if the pre-generated print job is cached at remote location, client service platform 202 can retrieve and transmit the cached pre-generated print job to the printer for immediate processing.

In an embodiment, cache manager 204 can be a management system for remote caching of pre-generated print jobs. In an example, cache manager 204 can be optional. The cache manager 204 can exist only when the pre-generated print jobs are to be cached centrally at a print server or at a print service such as net manager, or anywhere outside of the host computer. In this essence, the cache manager 204 can be a network service, application or a cloud service. In an example implementation, the cache manager 204 interfaces and communicates with the client service platform 202 and printer engine service 206 for the archival, caching, retrieval and transmission of pre-generated print jobs.

In an embodiment, printer engine service 206 can be a printer firmware update that analyzes incoming print jobs so as to confirm they are pre-generated print jobs from client service or from cache manager components. In an example implementation, depending on job parameters, printer engine service 206 can perform any or a combination of following functions:

Caches pre-generated print job at printer engine, wherein a secondary signal may be received from client service when user actually elects to print the print job, or if the cached pre-generated print job at the engine is obsolete somehow, the printer engine service can retrieve the more up-to-date pre-generated print job from a network shared storage or cloud storage service (it would be the responsibility of the client service or cache manager to send the up-to-date or valid pre-generated print job to the printer engine service) or when a secondary signal is received, the printer engine service performs next step below.

Transmits the pre-generated print job to the Raster Image Processor (RIP), a firmware that includes PDL interpreters, firmware for actual processing.

In an example implementation, depending on job parameters, printer engine service 206 may pre-render the pre-generated print job. In an example, new and relevant job parameters can be implemented and added to pre-render print jobs, which can facilitate identification of pre-rendered print jobs at host computers or at the printer engine to determine if print job will be cached or processed for immediate printing. In an example, all PDLs that have support for job parameters can be candidates to support print job pre-generator, which can include, but is not limited to PCL5, PCL6 (XL), PDF, XPS, OpenXPS, PPML, AirPrint/URF, Kyocera PRESCRIBE and future PDLs. In an example, job parameters can include, but are not limited to, PJL, XPS PrintTickets or PRESCRIBE commands and the like. In an example, printer engine service 206 can understand and process those job parameters to cache the print job or to have RIP firmware perform immediate processing.

In an example implementation, pre-generated print job can look like any other print job with the addition of new job parameters identifying the print job as a pre-generated print job or as a regular print job that is ready for immediate processing for printing. The following is an example of a modified PCL XL print job:

```
%-12345X@PJL JOB NAME="job name"
@PJL SET TIMEOUT=300
@PJL SET RESOLUTION=600
@PJL SET BITSPERPIXEL=1
@PJL COMMENT="INFO:NUP 1; DUPLEX OFF; QTY 1; COLORMODE COLOR;"
@PJL COMMENT="APP:C:\Program Files\Microsoft Office\OFFICE11\WINWORD.EXE;"
@PJL SET ECONOMODE=OFF
@PJL SET USERNAME="username"
@PJL SET JOBNAME="job name"
@PJL SET SPG_Mode=TRUE
@PJL SET SPG_JobID=100
@PJL SET SPG_Cache=TRUE
@PJL SET QTY=1
@PJL SET KPAGESPERSHEET=1
@PJL ENTER LANGUAGE=PCLXL
...
[ BINARY PCLXL DATA ]
...
%-12345X@PJL EOJ NAME="job name"
%-12345X
```

In an example, new main job parameters can include Mode, ID and Cache Action. It may be noted that new main job parameters are just examples but can be updated with information such as: document name, file name, timestamp of pre-generation, CRC code for encoding all of the information to ensure the same document are to be processed. It may be understood by a person skilled in the art that such examples are merely for illustration purposes. New job parameters may be added, as needed, in order to facilitate processing of features both at the document editing application, at the printer driver, at external devices, and at the printer engine with print job pre-generator support.

In an example implementation, a new mode job parameter can be identified based on whether the print job is a pre-generated print job or not. In an example, a PJL Syntax can be @PJL SET SPG_MODE=TRUE or FALSE, wherein SPG_MODE stands for Smart Pre-Generated Mode with possible True or False value. If it does not exist, print job is not pre-generated and can be immediately processed for printing, especially when the print job is received at the printer engine, which allows for backward compatibility of current print jobs or print drivers that does not have support for print job pre-generator feature. When TRUE, this means that the job is a pre-generated job.

In an example implementation, a job ID can be assigned to each pre-generated print job so that print job pre-generator client service, print engine service, and cache manager can work cooperatively in handling, maintenance, caching, updating, and printing of pre-generated print jobs. Value of this job ID can be determined based on what the various components can use to be able to work cooperatively. It can be a numeric counter maintained at the cache manager if the cache manager is an existing component. A timestamp can also be used but can be created from one place only to avoid duplication or dissimilarity that would make it difficult to identify the same pre-generated Print Job to be processed for printing. For example, PJL syntax can be: @PJL SET SPG_JobID=# where # is a determined job id that can be designated to pre-generate print jobs.

In an example, cache action can be a flag or signal that instructs whether the pre-generated print job is to be cached or can be immediately processed for printing. For example, PJL syntax can be: @PJL SET SPG_Cache=TRUE or FALSE, which when True, indicates that the pre-generated Print Job is to be cached and not sent to RIP for processing. When this is False, the pre-generated Print Job can be immediately processed for printing In an example implementation, other job parameters can be added for management of SPJPG print jobs. In an example, other pieces of information that could be needed and encoded with the SPJPG print job can include, but is not limited to, document name, file name, timestamp of printing, CRC code for encoding all of the information to ensure that the same document are to be processed. It may be understood that the examples are for illustration purposes only. These examples shall not restrict or limit the SPJPG technology for describing, handling, and management of SPJPG print jobs.

In an example implementation, when cache action is marked false, which can imply that the pre-generated print job is ready for immediate processing for printing, the following processing flow can occur:

Using the "Job ID" job parameter, pre-generated print job can be retrieved at the printer engine hard drive, or at the host computer, or at a network shared storage, or at a cloud storage service.

Send or transmit the pre-generated print job down to printer engine for processing through RIP firmware.

In an example implementation, since the pre-generated print job can exist outside or external of the signaling component (which can be the client service), it would be sufficient to send to the printer a minimal and very simple print job that just contains the print job pre-generator electronic signal or signal print job, which can be sent as a stand-alone, minimal print job that only contains job parameters relevant to print job pre-generator feature. An example of such a stand-alone and minimal signal print job can be:

```
%-12345X@PJL JOB NAME="SPG Signal Print Job"
@PJL SET SPG_Mode=TRUE
@PJL SET SPG_JobID=100
@PJL SET SPG_Cache=FALSE
%-12345X
```

With the value of SPG_Cache as False, the pre-generated Print Job identified by the SPG_JOBID value would be retrieved, transmitted (if not at the printer engine) and processed for printing.

Figure 3:
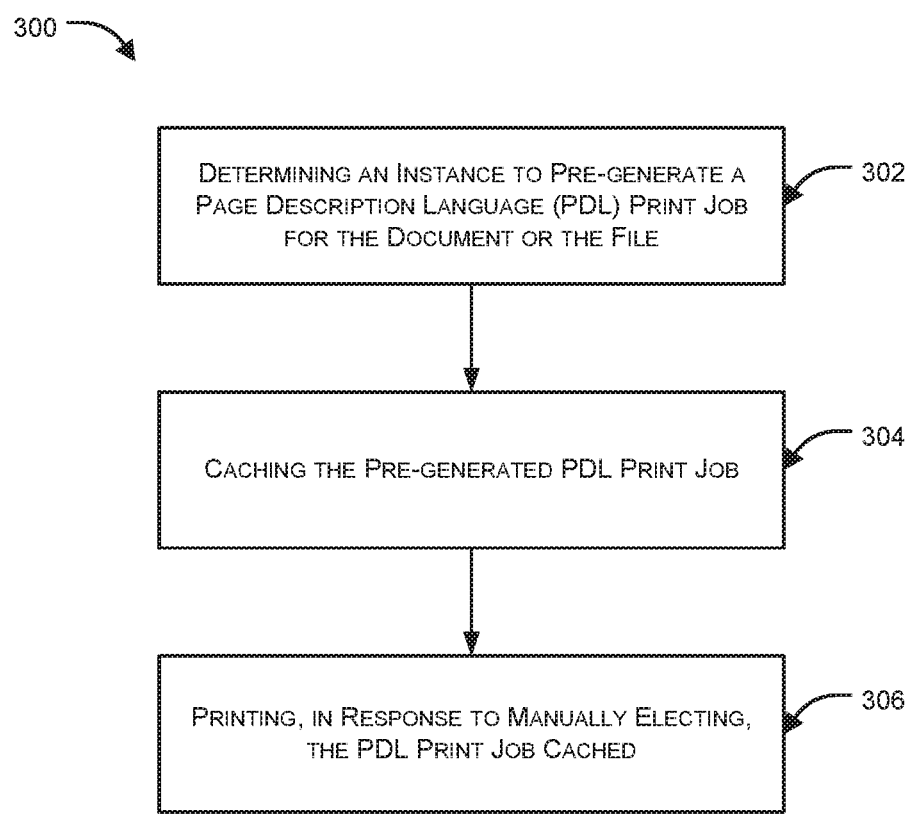
FIG. 3 illustrates an exemplary process for pre-generating a page description language (PDL) print job for a document for printing in accordance in accordance with an example implementation.

FIG. 3 illustrates an exemplary process for pre-generating a page description language (PDL) print job for a document for printing in accordance in accordance with an example implementation. The method of the present disclosure can include the steps of determining an instance to pre-generate the PDL print job for the document at step 302, caching the pre-generated PDL print job at step 304, and printing, in response to a manual election, the cached PDL print job at step 306.

In an embodiment, the instance to pre-generate the PDL print job for the document or the file is determined before manually electing the document or the file for printing.

In an example implementation, the instance can be selected from any or a combination of when a user creates or opens the document, or when the user edits the document but does not make any change after a certain period of time, or when the user opens print dialog, or when the user opens printing preferences, or any combination thereof.

In an example, when editing a document, the instances can be identified when user is either reading or thinking, and the document editing application is idle. Such instances can be considered as opportunities to pre-generate the PDL print job to anticipate the printing of the document. Examples of such instances, when it is possible to pre-generate the PDL print job, in preparation for printing, can be selected from but are not limited to:

When user creates or opens a document file—when document is loaded, the page content is unchanged and just displayed on screen.

When user edits the document but has not made changes after a certain period of time—after user has made changes, but pauses to read or think without adding new content.

When user opens print dialog—as user opens the print dialog, the page content is already finished and ready for printing.

When user opens printing preferences—as user browses through or makes changes to the print settings, the document is finished, and unchanged and ready for printing.

In an embodiment, all instances or at any point of time that the page content changes or that the print settings would affect the page content, the printer driver and/or client service can provide an indication that the previously pre-generated print job will be obsolete and hence may be discarded in the cache. The new pre-generated print job accordingly can be re-generated. In an exemplary implementation, such a scenario may be a fallback procedure that resembles current user experience where the PDL print job is created at the time when user elects to print.

In an example implementation, the document is an offline document, and herein the offline document or file is selected from a document or a file that can be transmitted directly to printers and/or a document or a file that can be transmitted via, a print queue or a print spooler.

In an example, there can be two types of offline documents that can be processed through the print job pre-generator according to the present disclosure. The two types of offline documents can be selected from but are not limited to:

Files that can be transmitted directly to printers—examples of such files includes but are not limited to: Image files such as JPG, TIFF, PNG etc, PDL PRN files such as PCLXL, PCL5, PRESCRIBE, XPS, PDF, PostScript etc. In another example, such files can be sent via FTP, LPR or printed through USB, etc.

Files that can be transmitted via print queue or spooler—Such files when dropped onto print queues would be processed through the printer driver for that print queue or spooler. In another example, the printer driver can work or coordinate with the associated editing application to process the file to generate a PDL print job.

In an example implementation, the document can be a portable document. The portable document can be selected from a set of documents that can be carried around in USB drives, and/or copied from one computer to another, and/or from cloud storage to another location.

In an example, the portable documents can be expected to be printed the same way regardless of their storage or location. In an implementation, any document can have a same pre-generated print job data, no matter where it is coming from, and no matter how many times it is transferred from one location to another.

In an implementation, the print job pre-generator component that pre-generates the print job, which can be the client service, can attach identifying information with the pre-generated print job. Such identifying information can be selected from a group of information such as but not limited to Job ID, CRC code, time stamp, document name, job name, source computer information, file path, etc.

In an example, when a document is loaded in an application in another computer in another location, or an offline document is copied onto USB drive and plugged onto a multi-function printer (MFP) for printing, the print job pre-generator can detect the identifying information and can locate the pre-generated print job that is cached at some different location, whether at the host computer, at the printer engine, at a network shared storage, at a cloud storage service. Thus, regardless where the document is to be printed, whether from an application or through direct printing, the pre-generated print job will be found, and would not have to be re-processed through the printer driver.

In an example implementation, the PDL print job pre-generated are transmitted and cached at a print queue or the PDL print job pre-generated are cached at a print queue. In an example, the PDL print job pre-generated cached is provided with identifying information and is arranged in the print queue utilizing the identifying information. Further, a latest version of the PDL print job pre-generated is retained in the cache.

In an example, according to the present disclosure, for each identified document that has a pre-generated print job, latest version can be retained in the cache. Obsolete versions of document may not be cached. It may be understood by a person ordinarily skilled in the art that such caching of obsolete or older versions of document shall be considered outside the scope of the present disclosure, and can be covered in the prior art. However, the cache according to the present disclosure can contain several kinds of documents that the user or users may have used in the past. In another example, the user can also select offline files and register them for advance pre-generation of Print Job so that those documents are ready when users had the need to print them.

In an embodiment, at step 302, there can be at least two general instances when PDL print job pre-generator can operate inside a document editing application. The two general instances can include but are not limited to:
  When the document is loaded for editing, or during those times that the user is not actively making changes, or when the application is not busy making changes to the document content, the print job pre-generator, printer driver and application will co-operate to pre-generate the PDL print job, in the background, abstracted and transparent to the user. In an example, initially, when document is loaded into the application, the print job pre-generator will check if a pre-generated print job already exists. If so, the print job pre-generator activates it as the active pre-generated print job for the current session. This way, the print job pre-generator in the current session would not have to re-generate the print job, thereby saving time even further.
  When user opens the printer dialog or printer preferences dialog, the print job pre-generator can cause the pre-generation of the PDL print job in the background, while the user makes changes to the print settings.

In an example implementation, the pre-generated PD print jobs at step 302 can be transmitted to and cached at the default print queue in step 304. In an example, the pre-generated PD print jobs can be cached at the host computer, at shared network storage, or at cloud storage such as One Drive, Dropbox or the like. In an example, if user selects a different printer to print the print job, the print job pre-generator system would know how to use and transmit the pre-generated print job to that printer at step 306.

In an example implementation, once the user elects to actually print the document, the print job pre-generator system according to the present disclosure, either at the printer engine, printer driver, or host computer, detects if a pre-generated PDL print job already exists, and if so, retrieve and use it as the main print job for printing.

In an embodiment, at step 302, the PDL print jobs can be generated from offline documents and files. In an example, it may be a requirement of the user that documents or files are directly printed, whether by transmitting directly to printer or transmitting via printer drivers. For such documents or files that are loaded into editing applications, the print job pre-generator feature according to the present disclosure can pre-generate PDL print jobs, offline or in the background, abstracted to the users.

In an example implementation, such PDL print jobs generated from the offline documents and files can be effective and can be appreciated when document content has not been modified after PDL print job is pre-generated and transmitted.

In an example implementation, offline documents can be processed in following manner:
  At step 302, offline documents for PDL print job pre-generation can be identified.
  PDL print jobs are pre-generated for the identified offline documents, and the generated PDL files can be cached on host computer, or in network storage, or in a cloud service such as OneDrive™, Dropbox™ or the like.
  When user elects to print the job, print job pre-generator system, either at printer engine, or at the printer driver, or at the port monitor or at the host computer, can detect that a pre-generated PDL print job already exists and retrieves and uses that for printing.

In an example implementation, offline documents or files can come from any location (host local hard drive, network shared storage or cloud storage like OneDrive or Dropbox. At step 304, pre-generated PDL print job can also be cached at host local driver, at network shared storage, or at a cloud service.

In an example implementation, since there are pre-generated PDL print job at step 302, printer driver may not have to re-process the file. Instead, printer driver processing can be skipped, and only the pre-generated PDL print job can be transmitted to the printer for actual RIP processing and printing at step 306, which saves time that would otherwise be spent in the printer driver, processing the file, and transmitting it to the printer, which as a result improves printing experience.

Figure 4:
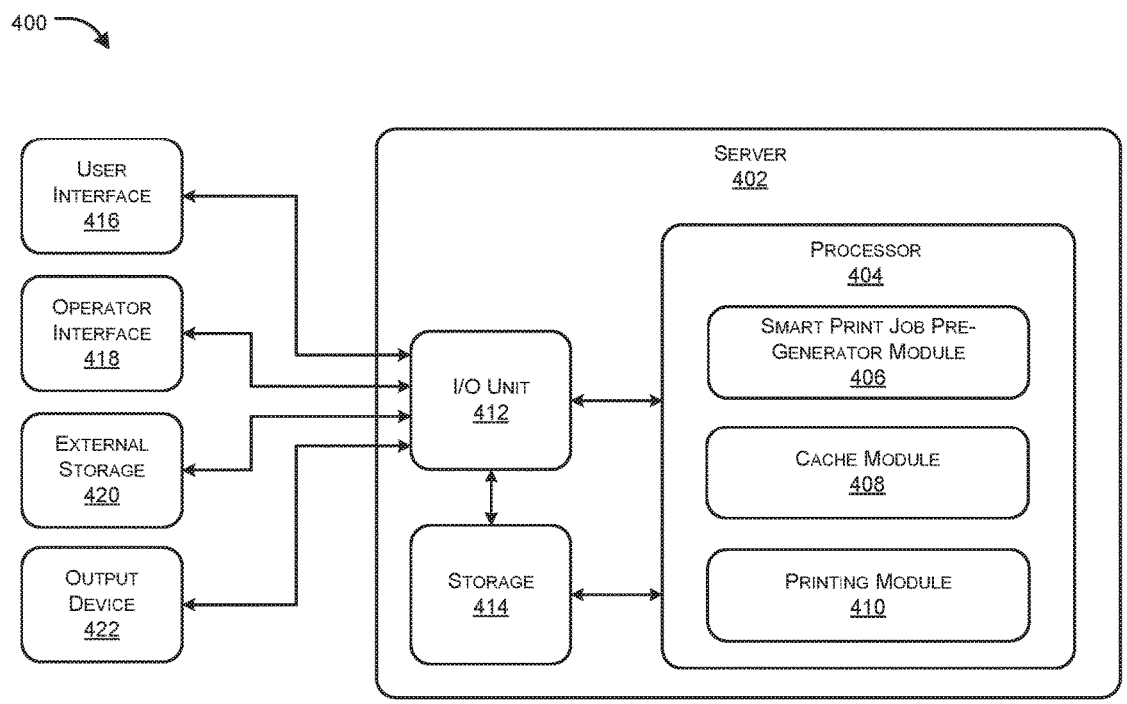
FIG. 4 illustrates an example computer system on which one or more embodiments may be implemented.

FIG. 4 illustrates an example computer system on which one or more embodiments may be implemented. This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 400 includes a server 402 that may involve an I/O unit 412, storage 414, and a processor 404 operable to execute one or more units as known to one skilled in the art. The term "computer-readable medium" as used herein refers to any medium that participates in providing instructions to processor 404 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 416 and operator interfaces 418 which may utilize input devices such as a keyboard, mouse, touch device, or verbal command The server 402 may also be connected to an external storage 414, which can contain removable storage such as a portable hard drive, optical media (CD or DVD), disk media or any other medium from which a computer can read executable code. The server may also be connected to an output device 422, such as a display to output data and other information to a user, as well as request additional information from a user. The connections from the server 402 to the user interface 416, the operator interface 418, the external storage 420, and the output device 422 may be via, wireless protocols, such as the 802.11 standards, Bluetooth® or cellular protocols, or via physical transmission media, such as cables or fiber optics. The output device 422 may therefore further act as an input device for interacting with a user.

The processor 404 can include a print job pre-generator module 406, a cache module 408, and a printing module 410. The print job pre-generator module 406 determines an instance to pre-generate the PDL print job for the document. The cache module 408 caches the PDL print job pre-generated. The printing module 410 processes the PDL print job cached for printing in response to a manually election.

In an example implementation, the system according to the present disclosure can be provided with a user interface that allows for the user to select offline documents and image files for pre-generation of print job so that they are ready for eventual printing. The cache and the list of registered documents are maintained and managed in the cache manager component of print job pre-generator system.

Moreover, other implementations of the present application will be apparent to those skilled in the art from consideration of the specification and practices of the example implementations disclosed herein. Various aspects and/or components of the described example implementations may be used singly or in any combination. It is intended that the specification and examples be considered as examples, with a true scope and spirit of the application being indicated by the following claims.

The invention claimed is:

1. A method for pre-generating a page description language (PDL) print job for printing a document, the method comprising the steps of:
   detecting a trigger instance automatically, using a processor of a computing device, and automatically generating, in response to the trigger instance detected, in a background, the PDL print job for the document, wherein the trigger instance is any or a combination of when a user creates or opens the document, or when the user edits the document but does not make any change for a certain period of time;
   caching, at a non-transitory storage device of the computing device, the automatically generated PDL print job, wherein latest version of the automatically generated PDL print job is retained in a cache, and the cached PDL print job is provided with identifying information;
   detecting the identifying information, and locating, based on the identifying information, the cached PDL print job; and
   issuing, from the computing device, to a printing device, a printing instruction in response to a manual election, wherein transmission of the printing instruction enables sending of the cached PDL print job to the printing device, wherein the trigger instance to automatically generate the PDL print job for the document is determined automatically before the manual election, and wherein the automatically generated PDL print job is transmitted and cached at a print queue, and arranged in the print queue based on the identifying information, and wherein the automatically generated PDL print job comprises additional job parameters to enable the printing device to differentiate between the automatically generated PDL print job and a regular print job.

2. The method of claim 1, wherein the document is an offline document that is transmitted directly to the printing device and/or is transmitted via a print queue or a print spooler.

3. The method of claim 1, wherein the document is a portable document that is carried around in a USB drive or copied from one computer to another or copied from cloud storage to another location.

4. The method of claim 1, wherein the printing instruction is a secondary signal received from the computing device when the automatically generated print job is sent in advance to the printing device.

5. The method of claim 1, further comprising: determining, by the processor of the computing device, a cache action to instruct whether the automatically generated print job is to be cached or is to be immediately processed for printing, wherein:
   if the cache action is true, the automatically generated PDL print job is cached, and
   if the cache action is false, the automatically generated PDL print job is immediately processed for printing.

6. The method of claim 1, wherein the step of detecting includes detecting the existence of a previously generated PDL print job, and if the previously generated PDL print job exists, activating the previously generated PDL print job as the print job for printing.

7. A system for pre-generating a page description language (PDL) print job for printing a document, the system comprising:
   a non-transitory storage device having embodied therein one or more modules operable to store the PDL print job for printing the document; and
   one or more processors coupled to the non-transitory storage device and operable to execute the one or more modules, wherein the one or more modules include:
      a print job pre-generator module configured to automatically detect a trigger instance to automatically generate, in response to the trigger instance detected, in a background, the PDL print job for the document, wherein the trigger instance is any or a combination of when a user creates or opens the document, or when the user edits the document but does not make any change for a certain period of time;
      a cache module configured to cache the automatically generated PDL print job in a non-transitory storage device of the system, wherein latest version of the automatically generated PDL print job is retained in a cache, and the cached PDL print job is provided with identifying information;
         wherein the print job pre-generator module is further configured to detect the identifying information and locate, based on the identifying information, the cached PDL print job; and
      a printing module configured to issue, in response to a manual election, a printing instruction for printing the PDL print job, wherein transmission of the printing instruction enables sending of the cached PDL print job to the printing device, wherein the trigger instance to automatically generate the PDL print job for the document is automatically determined before the manual election, and wherein the automatically generated PDL print job is transmitted and cached at a print queue, and arranged in the print queue based on the identifying information, and wherein the automatically generated PDL print job comprises additional job parameters to enable the printing device to differentiate between the automatically generated PDL print job and a regular print job.

8. The system of claim 7, wherein the document is an offline document that is transmitted directly to printers and/or is transmitted via a print queue or a print spooler.

9. The system of claim 7, wherein the document is a portable document that is carried around in USB drive or is copied from one computer to another or is copied from cloud storage to another location.

10. The system of claim 7, wherein the automatically generated PDL print job is cached before printing.

11. The system of claims 7, wherein the automatically generated PDL print job is transmitted by the print job pre-generator module, and cached by a cache module at a print queue, and arranged in the print queue based on the identifying information.

12. The system of claim 7, wherein the printing instruction is a secondary signal received from the computing device when the automatically generated print job is sent in advance to the printing device.

13. The system of claim 7, further comprising: a determining module configured to determine a cache action to instruct whether the automatically-generated print job is to be cached or is to be immediately processed for printing, wherein:
if the cache action is true, the automatically generated PDL print job is cached, and
if the cache action is false, the automatically generated PDL print job is immediately processed for printing.

14. The system of claim 7, wherein the print job pre-generator module is further configured to detect the existence of a previously generated PDL print job, and if the previously generated PDL print job exists, to activate the previously pre-generated PDL print job as the print job for printing.

15. A non-transitory computer-readable medium including computer-program instructions executable by a processor at a print device, the computer-program instructions when executed by the processor for performing operations comprising:
detecting a trigger instance automatically, using a processor of a computing device, and automatically generating, in response to the trigger instance detected, in a background, the PDL print job for the document, wherein the trigger instance is any or a combination of when a user creates or opens the document, or when the user edits the document but does not make any change for a certain period of time;
caching, at a non-transitory storage device of the computing device, the automatically generated PDL print job, wherein latest version of the automatically generated PDL print job is retained in a cache, and the cached PDL print job is provided with identifying information;
detecting the identifying information, and locating, based on the identifying information, the cached PDL print job; and
issuing, from the computing device, to a printing device, a printing instruction in response to a manual election, wherein transmission of the printing instruction enables sending of the cached PDL print job to the printing device, wherein the trigger instance to automatically generate the PDL print job for the document is automatically determined before the manual election, and wherein the automatically generated PDL print job is transmitted and cached at a print queue, and arranged in the print queue based on the identifying information, and wherein the automatically generated PDL print job comprises additional job parameters to enable the printing device to differentiate between the automatically generated PDL print job and a regular print job.

16. The non-transitory computer-readable medium of claim 15, wherein the automatically generated PDL print job is transmitted and cached at a print queue, and arranged in the print queue based on the identifying information.

17. The non-transitory computer-readable medium of claim 15, further comprising: determining, by the processor of the computing device, a cache action to instruct whether the automatically generated print job is to be cached or is to be immediately processed for printing, wherein:
if the cache action is true, the automatically generated PDL print job is cached, and
if the cache action is false, the automatically generated PDL print job is immediately processed for printing.

* * * * *